Patented Sept. 27, 1932

1,879,686

UNITED STATES PATENT OFFICE

ALPHONS O. JAEGER, LLOYD C. DANIELS, HERBERT J. WEST, AND CHARLES E. STEVENSON, OF CRAFTON, PENNSYLVANIA, ASSIGNORS, BY MESNE ASSIGNMENTS, TO THE SELDEN RESEARCH & ENGINEERING CORPORATION, OF PITTSBURGH, PENNSYLVANIA, A CORPORATION OF DELAWARE

PURIFICATION PROCESS USING SOLVENTS

No Drawing.   Application filed February 13, 1929.   Serial No. 339,736.

This invention relates to purification processes using solvents and more particularly to processes for purifying solid organic materials by solvent treatments.

Many organic compounds especially coal tar fractions and semi-refined coal tar crudes prepared therefrom are purified by crystallization from solvents. The materials most often so purified are anthracene, phenanthrene, acenaphthene, fluorene, diphenyl, pyrene, fluoranthene, chrysene, retene, naphthalene, etc. One of the most important of these crudes is crude anthracene which contains phenanthrene and carbazole and which is usually purified by subjecting it to one or more solvent treatments, usually recrystallizations.

The solvents which are ordinarily used in purifying these various crude products may be classified as follows:

1. Aliphatic hydrocarbons and halogen derivatives of aliphatic hydrocarbons, for example, gasoline, kerosene, chloroform, and carbon tetrachloride.

2. Coal tar hydrocarbons and halogen derivatives of coal tar hydrocarbons, liquid at ordinary or slightly elevated temperatures. Examples: benzene, toluene, xylene, solvent naphtha, chlorbenzene, orthodichlorbenzene, etc.

3. Other substitution products of coal tar hydrocarbons, liquid at ordinary temperatures, such as nitrobenzene, orthonitrotoluene, etc.

4. Phenols and phenolic bodies such as ordinary phenol, creosote oils, etc.

5. Hydrogenated aromatic hydrocarbons such as cyclohexane, tetraline and decaline.

6. Hydrogenation products of phenolic bodies and their esters such as cyclohexanol, cyclohexylacetate, etc.

7. Other alcohols such as menthanol, butanol amyl alcohol, benzyl alcohol, etc.

8. Ketones, such as acetone, cyclohexanone, etc. Also technical mixtures containing principally ketones such as acetone oils.

9. Amino compounds such as aniline, orthotoluidine, cyclohexylamine, methylcyclohexylamine, mono-, di-, and triethanol amines.

10. Aliphatic acids of low molecular weight or unsaturated acids of high molecular weight. As examples: acetic acid, oleic acid, maleic acid, etc.

11. Esters of common acids such as ethyl acetate, ethyl benzoate, etc.

12. Heterocyclic compounds such as furfural, pyridine, pyridine oils, etc.

Many of these solvents are relatively expensive and this is particularly true of the best solvents for the purification of anthracene, which are furfural and to a lesser extent pyridine. In the ordinary process the material to be purified is obtained as a filter cake from the crystallization processes or washing processes and naturally contains a considerable amount of solvent. The removal of this solvent presents a very serious problem and it is almost impossible to recover all of the solvent from the cake even when effective drying means are used with vapor recovery. Such installations also are very expensive and require considerable expert supervision. The difficulties and solvent losses entailed have been minimized to some extent by processes in which the expensive and usually high boiling solvent is washed out of the cake by a low boiling and usually much cheaper solvent. Thus, for example, pyridine or furfural may be washed out of an anthracene cake with benzol, but even such a process results in losses of the expensive solvent and of course large losses of the volatile solvent used to displace it and does not decrease either the expense or complexity of the solvent recovery plant required.

The present invention is based on the fact that the coal tar crudes which have been subjected to solvent purification are normally further subjected to processes involving vaporization, such as either further purification by distillation or sublimation or use in the catalytic vapor phase oxidation or other catalytic vapor phase reactions. Thus, for example, anthracene presscake from a solvent purification process using furfural or pyridine is normally vaporized and catalytically oxidized to anthraquinone. This is also true of acenaphthene, which is oxidized to naphthalic anhydride. Naphthalene may be oxidized or it may be sublimed in order to obtain purer grades of naphthalene for commercial use. All of these treatments require the melting of the crude and vaporization either by spraying or by passing a carrier gas thereover. In the case of distillation the crude is not only melted but heated to a temperature sufficient to cause it to boil. In most cases and particularly with the high melting crudes such as anthracene, the melting temperature is far above the boiling point of the solvent used in purifying the crude. According to the present invention the wet presscake from the solvent purification without drying and without subjecting it to costly treatment for the recovery of the solvent is introduced into a closed melter which is designed as a still. The material is melted and if necessary in the case of some very low melting products, such as phenanthrene or naphthalene, heated above its melting point and all of the solvent is boiled out. This process has a tremendous advantage over the ordinary drying process at low temperatures. The solvent is removed practically completely, it is removed rapidly and in apparatus which costs hardly any more than an ordinary melting tank, and the heat which is required to melt the material is normally sufficient to dry it, thus removing the necessity of using additional heat with corresponding cheapening of the process. The melting or melting and heating step which is necessary in order to vaporize the refined material is made to perform the additional function of drying the cake and of releasing the solvent in a form in which it is readily recovered as it is not contaminated with fixed gases, which is frequently the case when drying at low temperatures is used. Losses of solvent are reduced to a minimum, the cost of drying apparatus is entirely eliminated and the fuel consumed is substantially the same as when dried presscake is vaporized. The process, therefore, enables more complete solvent removal and far higher percentage recovery of solvents at a lower apparatus and operating cost.

While the present invention is applicable to all purifications, it will be described in a few specific examples, more particularly in connection with the purification of crude anthracene, the process in which the present invention finds perhaps its most important commercial field as in this process expensive solvents must often be used and all conditions are particularly favorable for the most efficient operation of the present invention. It should be understood, of course, that the examples merely set out illustrative embodiments of the invention, which is not limited to the specific details therein described.

Example 1

A crude anthracene of 30–32% anthracene content is dissolved in 4–5 volumes of toluene or solvent naphtha, the solution being heated to 85–95° C. The solution is then cooled to 25° C. or lower and the crystallized anthracene filtered off on a nutsch filter with suction to remove as much solvent as possible. The presscake is then washed with two successive portions of toluene or solvent naphtha, each being one-half volume based on the crude anthracene initially used. An analysis of the cake will show that 85–95% of the anthracene present in the crude has been recovered, and that 60–70% of the carbazole and 80% of phenanthrene have been removed. The filter cake is then heated in a melting kettle used as a still, the temperature rising to 215–230° C. The vapors of the solvent are condensed and the hot molten material is run into a hot storage tank where it is maintained in a molten condition until ready for introduction into the vaporizer of a converter for the catalytic oxidation of anthracene to anthraquinone or catalytic purification by burning out carbazole and phenanthrene.

Example 2

A crude anthracene such as that described in Example 1 is treated with orthodichlorbenzene instead of toluene or solvent naphtha, approximately the same amount of solvent being used. The anthracene content of the resulting cake rises from the original 30% to 66–68%, most of the purification taking place in the removal of phenanthrene but the carbazole content is also reduced to about 8–10%. The anthracene recovery will run from 94–97%, depending on the types of impurities in the original crude. In some cases the recovery may be a little lower. The filter cake is treated in the same manner as that described in Example 1 and very complete recovery of the solvent is obtained.

Example 3

A semi-purified anthracene containing 55–60% anthracene is purified as described in Example 2, resulting in an 85% anthracene filter cake with only 6–7½% of carbazole. The anthracene recovery is about 90% or slightly less and the cake is treated in the same manner as described above.

Example 4

A crude anthracene containing 25–26% anthracene is purified by recrystallization from furfural. The filter cake will show about 85–87% anthracene and the carbazole will be reduced to about 6.5–7.2%, the recovery of anthracene being about 90–94%, showing a tremendous effectiveness of the furfural as a solvent. The filter cake is treated in the

Example 5

A crude anthracene such as that described in Example 4 is recrystallized from orthodichlorbenzene and is then washed with furfural, resulting in a cake containing 73–77% anthracene. The filter cake is melted as described in the foregoing examples and the solvent recovered. The molten material may be vaporized and oxidized directly to anthraquinone with a suitable catalyst.

Example 6

A crude anthracene such as that described in Example 4 is subjected to a treatment which is the reverse of that in Example 5, that is to say it is crystallized from furfural and washed with orthodichlorbenzene. The resulting cake is of approximately the same purity as when furfural is used both as the crystallizing and washing solvent and is treated as described in the foregoing examples for solvent recovery.

Example 7

A crude anthracene containing 33–35% anthracene is suspended in 15 volumes of acetone, warmed to the boiling point of acetone and then cooled to 15° C. or lower, filtered, washed with 2–3 volumes of furfural and the cake treated as in the foregoing examples. The cake contains 80% anthracene and can be directly oxidized to anthraquinone with suitable oxidation catalysts. Instead of using acetone, acetone oils or cyclohexanone may be used to even greater advantage as their boiling points are higher than that of acetone and the the crystallization is accordingly more efficient.

Example 8

Crude anthracene containing 25–32% anthracene is suspended in 5 volumes of technical pyridine, heated to 75–80° C. until the mass is completely melted, cooled to 25° C. or lower, preferably very slowly, taking 18–48 hours in order to get large crystals, and then washed. The cake is treated for solvent recovery as described in the foregoing examples. The purification reduces the carbazole content to 8–9% and removes from 80–90% of the phenanthrene present. The melted anthracene can be used directly for oxidation to anthraquinone with suitable catalysts.

Example 9

The filtrate from any of the foregoing examples is heated to boil off the solvent and a still residue is obtained consisting principally of phenanthrene with some carbazole. This residue can be crystallized from 10 volumes of ethyl or methyl alcohol and a cake of purified carbazole is obtained, either in a nutsch filter or filter press, or in a centrifuge. This cake is then placed in a still and heated to 105–120° C., which temperature is maintained until the solvent is completely removed. The still is further heated to 240–260° C., at which temperature the mass is completely melted and can be dropped into the vaporizer of a sublimer in order to effect further purification by sublimation.

Example 10

The alcoholic filtrate from Example 9 is run directly into a still and the solvent distilled off. The residue is molten at the final temperature for the complete removal of the solvent, namely 105–120° C., and may be handled for the sublimation of the phenanthrene in the same manner as the molten carbazole in Example 9.

Example 11

A carbazole cake is obtained as described in Example 9 and after distilling off the alcohol the carbazole is recrystallized before sublimation by dissolving in aniline, orthotoluidine, or other solvent of a basic character. The cake obtained from recrystallization is heated for the removal of the solvent as described in the foregoing examples, using the necessary temperature to drive off all of the solvent and is then sublimed as described in Example 9.

Example 12

Instead of directly subliming the phenanthrene as described in Example 10, it is subjected to a further recrystallization using ethyl acetate or other low boiling ester. Advantageously the molten still residue after distilling off the alcohol may be run into the new solvent. The cake obtained from recrystallization is then treated for recovery of the second solvent and for sublimation as described in Example 10.

Example 13

A semi-purified acenaphthene containing 85–88% or better of acenaphthene is recrystallized from carbon tetrachloride. The cake is heated to 110–120° C. to remove the carbon tetrachloride and melts at about this temperature. The molten material can be dropped into a vaporizer connected with a converter for the catalytic oxidation of acenaphthene to naphthalic anhydride.

Example 14

A semi-refined fluorene containing 70% or more of fluorene is recrystallized from cyclohexane, tetraline or decaline, and the cake then heated to distill off the solvent. When cyclohexane is used, the solvent is removed before the cake melts and the temperature must then be raised to 120–135° C. to melt the still contents. In the case of tetraline or decaline the temperature necessary to remove all of the solvent is sufficiently high to melt the residue. The molten fluorene is dropped into a vaporizer, mixed with air and subjected to catalytic oxidation to fluorenone. Sometimes when using tetraline or decaline, which require for their removal temperatures far above the melting point for fluorene, it may be desirable to permit the still contents to drop in temperature somewhat before running the fluorene into the vaporizer.

*Example 15*

The procedure for recovering carbazole in Example 9 is carried out using nitrobenzene or orthonitrotoluene as a crystallizing solvent. These solvents have the advantage over alcohol that the temperature required for the final removal of the solvent is sufficiently high to maintain the carbazole molten and a somewhat better separation is obtained. Phenols and phenolic bodies such as creosote oil may also be used.

*Example 16*

Acenaphthene of 80% purity is washed with gasoline, the material and the solvent being mixed in the form of a thin slurry in a mixing tank, and run into a centrifuge. The centrifuge cake is then subjected to distillation as described in the foregoing examples and the molten anthracene can be vaporized and oxidized to naphthalic anhydride.

*Example 17*

The crude presscake from chilling and pressing green oil may be washed with any of a number of liquid hydrocarbons, such as benzene, toluene, solvent naphtha, or orthodichlorbenzene. The washed cake is then heated in a still for recovery of the solvent as described in the foregoing examples, the final temperature for complete removal of the solvent being about 200° C. It is then dropped into a vaporizer mixed with air and passed over an anthracene purification contact mass such as those described in the copending application of Alphons O. Jaeger, Serial No. 228,977, filed October 26, 1927 which has matured into Patent 1,846,728, Feb. 23, 1932.

The present invention is not concerned with any particular processes of catalytic oxidation or sublimation which follow the purification of the present invention. Suitable contact masses for these oxidations are described in the co-pending application of Alphons O. Jaeger, Serial No. 196,393 filed June 3, 1927 which has matured into Patent 1,709,853, Apr. 23, 1929.

What is claimed as new is:

1. A method of treating impure anthracene, which comprises subjecting it to a solvent purification with a solvent containing a major portion of furfural to obtain a filter cake containing purified anthracene admixed with solvent, heating the cake until no solid phase remains, permitting vapors of furfural to escape from the cake, recovering the furfural, vaporizing the molten anthracene, and subjecting it to vapor phase catalytic oxidation to anthraquinone.

2. A method according to claim 1, in which the solvent purification process involves recrystallization from furfural.

Signed at Pittsburgh, Pennsylvania, this 4th day of February, 1929.

ALPHONS O. JAEGER.
LLOYD C. DANIELS.
HERBERT J. WEST.
CHARLES E. STEVENSON.